United States Patent
Ogata et al.

(10) Patent No.: US 8,354,354 B2
(45) Date of Patent: Jan. 15, 2013

(54) ANTI-ALUMINA-BUILDUP REFRACTORIES FOR CASTING NOZZLES

(75) Inventors: Koji Ogata, Kitakyushu (JP); Donald Bruce Hoover, York, PA (US)

(73) Assignees: Krosakiharima Corporation, Fukuoka (JP); LWB Refractories Company, York, PA (US)

(*) Notice: Subject to any disclaimer, the term of this patent is extended or adjusted under 35 U.S.C. 154(b) by 0 days.

(21) Appl. No.: 13/136,850

(22) Filed: Aug. 12, 2011

(65) Prior Publication Data
US 2011/0297707 A1    Dec. 8, 2011

Related U.S. Application Data

(62) Division of application No. 10/524,621, filed as application No. PCT/JP03/10474 on Aug. 19, 2003, now abandoned.

(30) Foreign Application Priority Data

Aug. 20, 2002 (JP) .................. 2002-239940

(51) Int. Cl.
*C04B 35/057* (2006.01)
(52) U.S. Cl. ........ 501/133; 428/701; 222/590; 222/591; 222/606; 222/607; 266/286; 266/284
(58) Field of Classification Search ............. 501/123; 222/590, 591, 606, 607; 266/286, 284
See application file for complete search history.

(56) References Cited

U.S. PATENT DOCUMENTS

| | | | | |
|---|---|---|---|---|
| 5,124,288 A | * | 6/1992 | Ishikawa et al. | 501/121 |
| 7,891,408 B2 | * | 2/2011 | Ogata et al. | 164/488 |
| 2009/0096124 A1 | * | 4/2009 | Ogata et al. | 264/112 |

FOREIGN PATENT DOCUMENTS

| | | | |
|---|---|---|---|
| EP | 1541259 | * | 6/2005 |
| JP | 61-256961 | | 11/1986 |
| JP | 63132755 | * | 6/1988 |
| JP | 4-28462 | | 1/1992 |
| JP | 6-247767 | | 9/1994 |
| JP | 7-40015 | | 2/1995 |
| JP | 08103865 | * | 4/1996 |

* cited by examiner

*Primary Examiner* — Karl Group
(74) *Attorney, Agent, or Firm* — Jordan and Hamburg LLP

(57) ABSTRACT

Disclosed is anti-alumina-buildup refractories for casting nozzles, which comprises a refractory aggregate including 20 mass % or more of CaO component, and 10 mass % or more of clinker particles each containing CaO as a mineral phase, on the basis of 100 mass % of the entire composition. At least a part of the surfaces of the CaO exposed from the surfaces of the corresponding clinker particles is formed with a $CaCO_3$ film. The $CaCO_3$ film releases $CO_2$ gas through thermal decomposition to smooth an operative surface of the nozzle so as to prevent the accretion of metal thereon, so that CaO is continuously supplied to alumina attached on the operative surface to prevent alumina buildup. In addition, the $CaCO_3$ film effectively prevents the hydration of CaO due to a hydration reaction.

1 Claim, No Drawings

ANTI-ALUMINA-BUILDUP REFRACTORIES FOR CASTING NOZZLES

This is a Divisional Application of U.S. Ser. No. 10/524,621 Filed Mar. 17, 2005, now abandoned.

TECHNICAL FIELD

The present invention relates to refractories applicable to a nozzle for continuous casting of steel, such as immersion nozzle, upper nozzle, sliding nozzle, lower nozzle or long nozzle, and more particularly to refractories applicable to an inner hole portion of such a casting nozzle to be in contact with molten steel, to prevent alumina buildup thereon.

BACKGROUND ART

Responding to recent requirements stricter quality control of steel products, a good deal of effort has been made to reduce non-metallic inclusions, such as alumina which builds up on an inner hole portion of a nozzle for continuous casting of steel. Moreover, in terms of casting operations, the buildup of alumina and others which arises from long hours of casting is likely to cause clogging of the inner hole portion and difficulties in continuing the casting operation, which hinders the improvement in productivity.

As one of measures against the alumina buildup, there has been known a technique in which argon gas is injected from the inner surface of a nozzle into molten steel to prevent the alumina buildup in physical manner. In this technique, if the argon gas is injected at an excessive amount, bubbles of the injected argon gas will be incorporated into molten steel to form pinholes in slabs. Thus, due to the restriction in the allowable injection amount of argon gas, this method cannot be exactly used as a sufficient measure for preventing the alumina buildup.

There has also been known a technique intended to provide an anti-alumina-buildup function to refractories themselves. For example, in view of inducing the reaction between alumina attached on a refractory nozzle and CaO contained in the refractories to form a low-melting-point or fusible substance, Japanese Patent Publication No. 61-44836 discloses a casting nozzle using refractories containing a combination of graphite, and either one of sintered calcia, fused calcia and another ceramic material containing a CaO component. While such CaO-containing refractories can exhibit an anti-alumina-buildup effect in some cases, it is likely to cause increase in alumina buildup depending on the circumstances.

Further, when applying refractories containing CaO as a mineral phase to a casting nozzle, the CaO is likely to undesirably hydrated due to a hydration reaction with water absorbed therein. While Japanese Patent Laid-Open Publication No. 10-5944 discloses a technique of adding $CaCO_3$ as aggregate to prevent the hydration, the $CaCO_3$ aggregate is pyrolytically decomposed to have a high porosity, and the resulting irregularity of an effective or operative surface of a casting nozzle leads to undesirable alumina buildup thereon.

DISCLOSURE OF INVENTION

In view of the above problems concerning the measures against aluminum buildup on CaO-containing refractory nozzles, it is therefor an object of the present invention to provide refractories for casting nozzles capable of bringing out an excellent effect of suppressing the alumina buildup on an operative surface, and an effect of preventing the hydration of CaO due to a hydration reaction.

Through various research on achieving this object, based on analyses of the phenomenon of alumina attachment/buildup on an operative surface of CaO-containing refractories, it was found that metal is first attached on the surface of the refractories, and alumina is then attached on the metal.

According to the observation of a portion of the surface having the metal attached thereon, the portion of the refractory surface had a large irregularity. Based on this fact, it is verified that this irregularity generates stagnation in molten flow to accelerate the accretion of metal thereon, and the accreted metal blocks the dispersion of CaO from refractories constituting a casting nozzle (hereinafter occasionally referred to as "nozzle") to preclude alumina attached on the metal from being converted to a fusible substance.

Using the above knowledge that the alumina buildup is caused by the penetration of metal, such as molten steel, into the refractory matrix in advance of alumina, the inventor found that the penetration of molten steel into the matrix of refractories constituting a nozzle and including clinker particles each including CaO as a mineral phase can be suppressed by forming $CaCO_3$ on at least a part of the surfaces of the CaO exposed outside from the surfaces of the corresponding clinker particles, so as to achieve an enhanced anti-alumina-buildup function, and finally accomplish the present invention. While it is preferable to form $CaCO_3$ on all of the surfaces of the CaO exposed outside from the surfaces of the corresponding clinker particles, the $CaCO_3$ may be formed on only a part of the surfaces of the CaO to obtain the anti-alumina-buildup accordingly.

Specifically, the present invention provides refractories applicable to a casting nozzle, primarily an inner hole portion of the nozzle, which comprises refractory aggregate including 20 mass % or more of CaO component, and 10 mass % or more of clinker particles each containing CaO as a mineral phase, on the basis of 100 mass % of the entire composition. In these refractories, at least a part of the surfaces of the CaO exposed from the surfaces of the corresponding clinker particles is formed with a $CaCO_3$ film.

A function to be contained from the formation of $CaCO_3$ on at least a part of the exposed surfaces of the CaO will be described below based on reaction formulas.

$CaCO_3$ on the surface of the clinker is decomposed by a heat load from molten steel to release $CO_2$ gas.

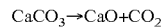

The released $CO_2$ reacts with aluminum in the molten steel to form alumina on the operative surface of the nozzle.

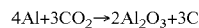

The formed alumina reacts with CaO to form a fusible substance so as to smooth the operative surface. This prevents the accretion of metal while facilitating the continuous supply of CaO to alumina attached on the operative surface, to suppress/prevent the alumina buildup.

As above, the suppression of the alumina buildup can be achieved only if $CaCO_3$ is allowed to exist only on the surface of the clinker particle so as to maintain the smoothness of the operative surface. When using $CaCO_3$ as aggregate as in the aforementioned Japanese Patent Laid-Open Publication No. 10-5944, the smoothness of an operative surface cannot be maintained because the $CaCO_3$ aggregate itself has a high porosity.

The formation of $CaCO_3$ on the surface of CaO exposed outside from the surface of the clinker particle in the refractories additionally provides a function of preventing the hydration of CaO due to a hydration reaction. To facilitate the reaction between alumina precipitated in molten steel and the CaO in the nozzle itself, to form a fusible substance, the CaO may be contained in the refractories at 20 mass % or more on the basis of 100 mass % of the entire nozzle composition.

In the present invention, the aggregate may include 20 mass % or more of CaO component, and 10 mass % or more of clinker particles each containing CaO as a mineral phase, on the basis of 100 mass % of the entire composition. The aggregate may be used together with another refractory aggregate without any problem.

In view of the anti-alumina-buildup effect, a clinker particle containing CaO as a mineral phase, so-called free-CaO, at 10 mass % or more, preferably 20 mass % or more, more preferably 30 mass % or more, specifically calcia-magnesia clinker including calcia clinker and dolomite clinker, may be preferably used to facilitate the formation of the $CaCO_3$ film on the surface of CaO in the clinker particle.

Any combination of $CaZrO_3$ clinker or CaO—SiO clinker, which contains no CaO as a mineral phase; material containing CaO-based compound as a primary component; carbon-based material, such as graphite or carbon black; and magnesia-based or zirconia-based material commonly used with refractories, may be additionally used as aggregate according to need.

The following technique may be used to form the $CaCO_3$ film on at least a part of the surfaces of the CaO exposed outside from the surfaces of the corresponding clinker particles.

(1) A nozzle molded integrally with the refractories is subjected to a heat treatment under a $CO_2$ atmosphere at a temperature of 300 to 850° C. Alternatively, the molded nozzle is subjected to a heat treatment at a temperature of greater than 850° C., and then cooled under a $CO_2$ atmosphere in the temperature range of 300 to 850° C.

(2) The molded nozzle is burnt in a conventional process, and is then subjected to a heat treatment under a $CO_2$ atmosphere at a temperature of 300 to 850° C., again.

$CaCO_3$ may be formed on the surface of the clinker particle to have a thickness in the range of 0.07 to 7 μm, preferably 0.1 to 5 μm, more preferably 0.5 to 5 μm. If the thickness is less than 0.1 μm, the amount of $CO_2$ to be generated from thermal decomposition will be reduced, and consequently the amount of alumina to be formed on the operative surface will be reduced. While the thickness of less than 0.1 μm causes deterioration in the anti-hydration effect, if the thickness is at least 0.07 μm, a practically acceptable level can be maintained because the alumina buildup will occur only in a significantly limited area, and the deterioration in the anti-hydration effect is not significant unless the nozzle is left in nonuse for a long period of time. If the thickness is greater than 5 μm, the surface of the clinker will have an increased porosity after the release of $CO_2$ likely to car difficulty in obtaining smoothness in the operative surface. However, if the thickness is 7 μm or less, a practically acceptable level can be remained because the alumina buildup caused by the increase porosity in the operative surface occurs only in a partial area. In this case, the anti-hydration effect is not particularly deteriorated. The thickness of the $CaCO_3$ film can be controlled by adjusting at least one of the $CO_2$ concentration, time and temperature for inducing the reaction between CaO and $CO_2$.

$CaCO_3$ is thermally decomposed at a temperature of about 900° C. or more. Thus, where a preheat temperature of the nozzle is set at 900° C. or more, the release of $CO_2$ before the inflow of molten steel is likely to spoil the anti-alumina-buildup effect. As one measure against this problem, an antioxidant may be applied on the $CaCO_3$ film. Specifically, this antioxidant is fused to form a glass layer on the $CaCO_3$ film, and the glass layer acts to suppress the release of $CO_2$ until the inflow of molten steel, so as to allow the anti-alumina-buildup effect to be adequately brought out.

Preferably, the refractories of the present invention primarily designed to obtain the anti-alumina-buildup effect are applied to a surface of continuous casting refractories to be in contact with molten steel. In this case, the refractory use as an inner hole portion may be integrally molded together with other nozzle component materials, or may be formed as sleeve-shaped refractories and inserted into or adhesively bonded to a refractory nozzle body.

In the present invention, the $CaCO_3$ film is formed only on the surface of CaO exposed outside from the surface of the clinker particle. Thus, the increase in porosity due to decomposition of $CaCO_3$ can be minimized to achieve approximately no deterioration in strength after decomposition of $CaCO_3$.

Thus, the refractories of the present invention are applicable to not only an inner hole portion but also an nozzle body. In addition, nozzle body and the inner hole portion may be formed using the same material to provide enhanced productivity. The refractories of the present invention may also be applied as a baffle for preventing uneven molten steel flow in the nozzle.

BEST MODE FOR CARRYING OUT THE INVENTION

A preferred embodiment of the present invention will now be described in connection of Examples.

Table 1 shows the composition of a compound for use in forming refractories of the present invention, the conditions of a treatment for forming $CaCO_3$, and characteristics of obtained refractories, together with Comparative Example.

TABLE 1

| | | Comparative Example | Inventive Example | | | | | | |
|---|---|---|---|---|---|---|---|---|---|
| | | 1 | 1 | 2 | 3 | 4 | 5 | 6 | 7 |
| compounding ratio (%) | graphite (0.5 mm or less) | 30 | 30 | 30 | 30 | 30 | 30 | 30 | 30 |
| | dolomite clinker (1 mm or less) | 20 | 20 | 20 | 20 | 20 | 20 | 20 | 20 |
| | dolomite clinker (0.2 mm or less) | 30 | 30 | 30 | 30 | 30 | 30 | 30 | 30 |
| | dolomite clinker (0.074 mm or less) | 20 | 20 | 20 | 20 | 20 | 20 | 20 | 20 |
| Treatment Under $CO_2$ atmosphere during cooling | | Non | Yes | Yes | Yes | Yes | Yes | Yes | Yes |
| measured value | CaCO3 film thickness (μm) | 0 | 0.07 | 0.1 | 0.5 | 1 | 2 | 5 | 7 |
| | alumina buildup test * | x | Δ | ○ | ○ | ○ | ○ | ○ | Δ |
| | hydration test (index of strength) | 7 | 73 | 94 | 98 | 100 | 100 | 100 | 100 |

* Alumina buildup test: ○: no buildup, Δ: buildup only in a part of the surface, x: buildup in 50% or more of the entire surface An appropriate amount of phenol resin as organic binder was added to each of the materials as shown in Table 1, and the mixture was homogenously kneaded. The obtained compound was subjected to a cold isostatic pressing (CIP) process under a pressure of 1000 Kg/cm$^2$, and burnt under a reduction atmosphere at a temperature of 1000° C.

In Comparative Example, the burnt product was directly cooled. In Inventive Examples 1 to 7, when a temperature in a furnace was reduced to 850° C. during the course of the cooling, $CO_2$ was supplied into the furnace to form a $CaCO_3$ film on the surfaces of CaO exposed outside from the surfaces of respective dolomite clinker particles.

The thickness of the $CaCO_3$ film was measured by observing the cut section of the clinker particle using a scanning electron microscope, and controlled by adjusting the partial pressure and supply time of $CO_2$.

In the alumina buildup test, molten steel of low-carbon aluminum-killed steel with 0.2% of aluminum dissolved therein was maintained at 1570° C., and a rod-shaped sample was immersed into the molten steel. After 60 minutes, the sample was pulled out to evaluate the amount of alumina buildup. In Table 1, ○ indicates a sample having no alumina buildup, Δ indicated a sample having alumina buildup only in a part of the surface, and x indicates a sample having alumina buildup in 50% or more of the entire surface.

The hydration test was performed by measuring the bending strength of a sample after being maintained under a temperature of 35° C. and a relative humidity of 70% for 3 days, and expressing the measured bending strength value as an index on the basis of 100 of the bending strength of the sample before the test. An index closer to 100 indicates a better result or less deterioration in the strength.

As compared to Comparative Example, all of Inventive Examples 1 to 7 have better results in both the alumina buildup test and the hydration test. The anti-alumina-buildup and anti-hydration effects from $CaCO_3$ were observed in Inventive Examples 1 to 7 having a film thicknesses of 0.07 μm to 7 μm. An optimal film thickness was in the range of 0.1 to 5 μm as in Inventive Examples 2 to 6. Among them, Inventive Examples 3 to 6 having a film thickness of 0.5 to 5 μm had particularly good results.

As mentioned above, in the continuous casting refractories including clinker particles each containing CaO as a mineral phase, the $CaCO_3$ film formed on the surfaces of the CaO exposed outside from the surfaces of the respective clinker particles releases $CO_2$ gas through thermal decomposition to smooth the operative surface so as to prevent the accretion of metal thereon, so that CaO is continuously supplied to alumina attached on the operative surface to prevent the alumina buildup. In addition, the $CaCO_3$ film effectively prevents the hydration of CaO due to a hydration reaction so as to provide enhanced operational efficiency and steel quality in continuous casting.

INDUSTRIAL APPLICABILITY

The present invention is applicable as anti-alumina-buildup refractories for use in inner hole portions of various nozzles for continuous casting of steel.

What is claimed is:

1. A casting nozzle, comprising a nozzle structure including an inner hole portion that comes in contact with molten steel during use, said inner hole portion being constructed of a refractory aggregate which includes 20 mass % or more of CaO component, and 10 mass % or more of a clinker including CaO as a mineral phase, at least a portion of an outer surface of the CaO is developed on a particle surface of said clinker including CaO as mineral phase coated with a $CaCO_3$ film having 0.1 to 5 μm thickness which is provided only on the outer surface of the CaO particles that are exposed on an operative surface of the inner hole portion of the casting nozzle, wherein the $CaCO_3$ film is formed by cooling to under 300 to 850° C. in a $CO_2$ atmosphere after first being heated at a temperature above 850° C.

* * * * *